(No Model.)

S. R. THOMPSON.
Mill for Manufacturing and Sifting Meal, &c.

No. 233,577. Patented Oct. 19, 1880.

Witnesses:
H. G. Wadlin,
J. M. Skinner.

Inventor:
S. R. Thompson,
by Wright & Brown,
Attys.

N. PETERS, PHOTO-LITHOGRAPHER, WASHINGTON, D. C.

UNITED STATES PATENT OFFICE.

SAMUEL R. THOMPSON, OF BROOKLINE, MASSACHUSETTS.

MILL FOR MANUFACTURING AND SIFTING MEAL, &c.

SPECIFICATION forming part of Letters Patent No. 233,577, dated October 19, 1880.

Application filed May 6, 1880. (No model.)

*To all whom it may concern:*

Be it known that I, SAMUEL R. THOMPSON, of Brookline, in the county of Norfolk and State of Massachusetts, have invented certain Improvements in Mills for Manufacturing and Sifting Meal, &c., of which the following is a specification.

This invention has for its object to provide an improved device for rapidly sifting meal in the machine by which it is formed, arresting all fragments or particles larger than the desired size, and reducing such fragments or particles before they can reach the accumulation of meal produced by the machine.

To this end my invention consists in the improved sifting and reducing apparatus which I will now proceed to describe and claim.

Figure 1:
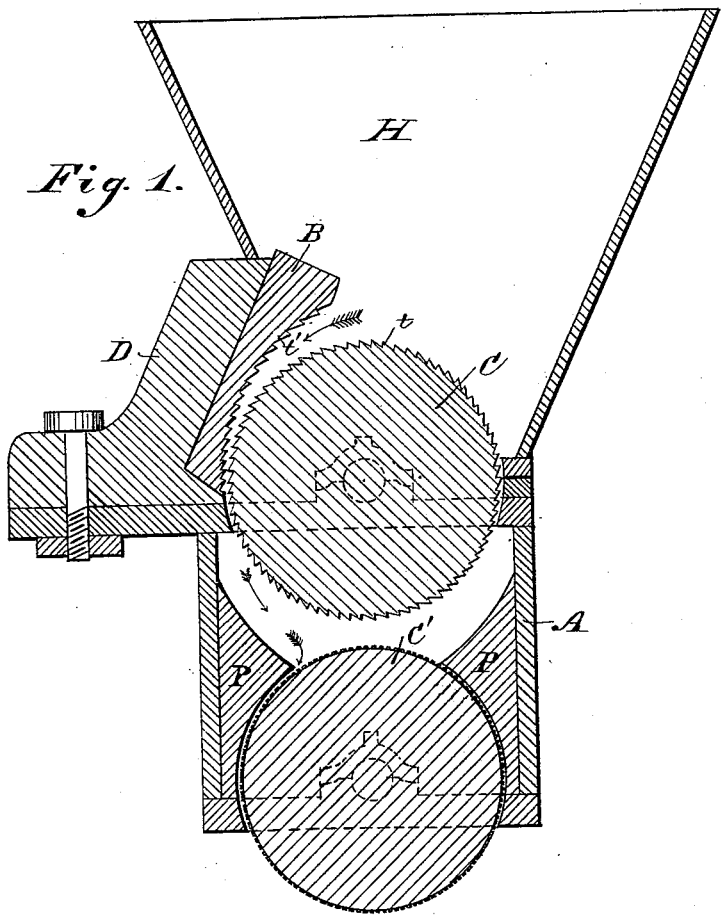
Figure 2:

Of the accompanying drawings, forming a part of this specification, Figure 1 represents a vertical transverse section of a machine embodying my invention. Fig. 2 represents an enlarged view of a portion of the lower rotating cylinder, showing the depressions and burrs in its periphery. In these figures the same letters refer to the same parts.

In the drawings, A is the frame of the machine. H is the hopper, at the bottom of which is the cylinder C, having its axis or arbor journaled in bearings in the sides of the frame A, as shown by the dotted lines. The periphery of the cylinder is provided with parallel cutting edges or teeth $t$, extending longitudinally from end to end of the cylinder. One side of the hopper is provided with the plate B, rigidly secured to the block D, supported from the frame of the machine. The plate B has its inner surface provided with teeth $t'$, also extending longitudinally in parallel rows, and varying in fineness from the upper to the lower edge of the block, as shown. Below the cutting-cylinder, and extending downwardly therefrom, is a chute or passage, formed in the present instance by the frame A and blocks P P, attached thereto.

C' represents a horizontal metallic cylinder journaled in the frame A, and located in the chute or passage below the cutting-cylinder. The blocks P P have inclined upper surfaces, which converge toward the cylinder C', and concave sides in such close proximity to the periphery of the cylinder C' that nothing except very fine particles of meal can pass between the periphery of the cylinder and the sides of the blocks P. In the periphery of the cylinder C' are formed minute pockets or depressions of sufficient depth only to receive particles of meal of the proper degree of fineness. These depressions are preferably formed by indenting the cylinder with a tool, which will displace a portion of the surface and form not only depressions, but also burrs or points like the teeth of an ordinary rasp, as shown in Fig. 2. Said burrs or points act to cut and reduce the coarse particles of grain, as hereinafter described.

If desired, the surface of the cylinder C' may be formed like a double-cut file, the continuous depressions or grooves and burrs thus formed having the same effect as the separate depressions formed as above described.

As before stated, the depressions in the cylinder C' are only large enough to receive particles of meal which have been reduced to the desired fineness. The coarser particles accumulate above the cylinder C', and are reduced by the burrs or points on the latter when said burrs are passing the edge of one of the blocks P, the meal formed by said burrs falling into the depressions between the burrs and being carried down thereby. In case the coarser particles accumulate above the cylinder C' so as to reach the cylinder C before they can be reduced by the burrs, the teeth of the cylinder C catch up the particles and carry them to the space between the teeth $t\,t'$, where they are again reduced.

In the operation of the machine grain is poured into the hopper H, and, the cylinders C C' being rotated, the grain is first subjected to the action of the teeth $t\,t'$, and as it is reduced falls upon the blocks P P and cylinder C'. It then, if sufficiently reduced, passes the concave surface of one of the blocks P in the indentations of the cylinder C' and issues in the form of meal below.

The cylinder C' and the contiguous portions of the chute constitute a sieve, which permits the passage of the finer particles of grain and arrests the larger particles, which are then reduced by the burrs, as above described, so that the meal that is taken from the machine is in a uniform condition of fineness.

I claim as my invention—

In a grain-cutting machine, sifting and reducing mechanism consisting of, first, a horizontal rotary cylinder having on its periphery minute pockets or depressions to receive properly-reduced particles and burrs or points to reduce larger particles, and, secondly, a chute or passage containing the cylinder and formed to prevent the passage between the periphery of the cylinder and the walls of the chute of any particles larger than those properly reduced, said larger particles being arrested and subsequently reduced by the burrs or points, as set forth.

In testimony whereof I have signed my name to this specification, in the presence of two subscribing witnesses, this 23d day of April, A. D. 1880.

SAMUEL R. THOMPSON.

Witnesses:
H. G. WADLIN,
C. F. BROWN.